US009740833B2

(12) United States Patent
Grasso, Jr.

(10) Patent No.: US 9,740,833 B2
(45) Date of Patent: Aug. 22, 2017

(54) PERSONALIZED AUDIO CONTENT DEVICE FOR GIFTING AUDIO CONTENT

(71) Applicant: Antonio A. Grasso, Jr., North Charleston, SC (US)

(72) Inventor: Antonio A. Grasso, Jr., North Charleston, SC (US)

(*) Notice: Subject to any disclaimer, the term of this patent is extended or adjusted under 35 U.S.C. 154(b) by 85 days.

(21) Appl. No.: 14/624,946

(22) Filed: Feb. 18, 2015

(65) Prior Publication Data
US 2015/0255111 A1 Sep. 10, 2015

Related U.S. Application Data

(60) Provisional application No. 61/941,037, filed on Feb. 18, 2014.

(51) Int. Cl.
G06F 17/00 (2006.01)
G06F 21/10 (2013.01)
G06F 3/16 (2006.01)

(52) U.S. Cl.
CPC .............. *G06F 21/10* (2013.01); *G06F 3/165* (2013.01); *G06F 2221/0731* (2013.01)

(58) Field of Classification Search
CPC ..... B65D 2203/12; G09B 5/065; G09F 25/00; G09F 3/12; H04R 1/028
See application file for complete search history.

(56) References Cited

U.S. PATENT DOCUMENTS

| 3,057,093 | A | 3/1961 | Gallo | |
|---|---|---|---|---|
| 5,387,108 | A | 2/1995 | Crowell | |
| 6,801,815 | B1* | 10/2004 | Filo | G11C 7/16 370/272 |
| 7,356,154 | B1* | 4/2008 | Kotzin | H04R 1/028 381/123 |
| 2006/0178946 | A1 | 8/2006 | Agarwal | |
| 2007/0153638 | A1* | 7/2007 | Lebbing | B44C 5/005 368/274 |
| 2010/0325923 | A1* | 12/2010 | Dial | G09F 3/12 40/124.03 |
| 2012/0059703 | A1 | 3/2012 | McCoy | |

* cited by examiner

*Primary Examiner* — Thomas Maung
(74) *Attorney, Agent, or Firm* — McNair Law Firm, P.A.; Douglas W. Kim

(57) ABSTRACT

This invention is directed to a computerized audio content gifting device. The ability to send audio content to a recipient as a gift allows the personalization of gifts such as flowers and candy to be made. The invention includes a housing with a circuit board, operational buttons, a communication port, a speaker, an attachment member and, a set of computer readable instructions stored on the computer readable medium that, when executed by the processor, provides for: receiving audio content from a server in electronic communications with the circuit board using the communications port, playing the audio content when an operational button is placed in the "on" position. The invention can also determine if there are copyright restrictions on the audio content and manage the number of authorized copies.

8 Claims, 8 Drawing Sheets

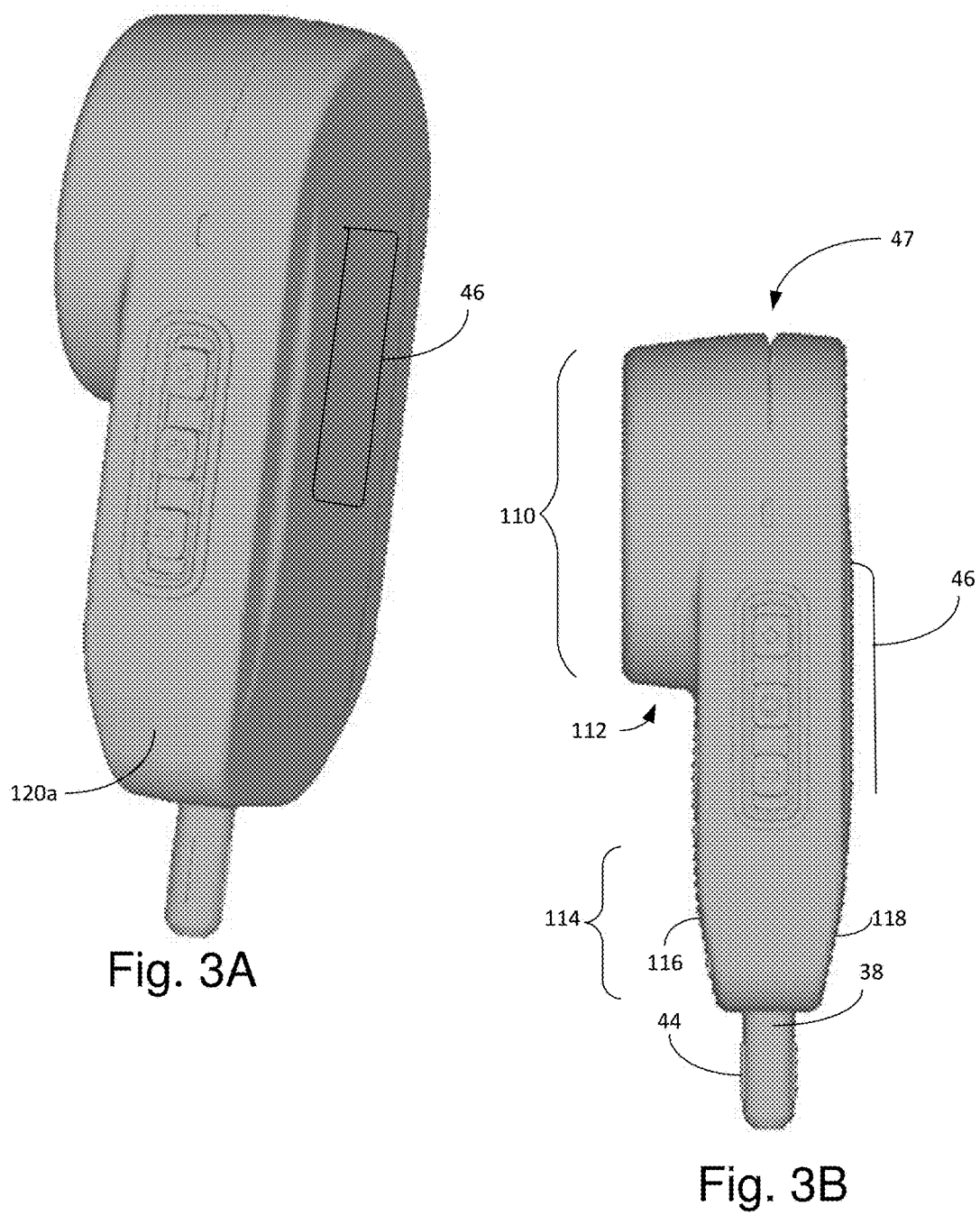

PERSONALIZED AUDIO CONTENT DEVICE FOR GIFTING AUDIO CONTENT

FIELD OF THE INVENTION

This invention is directed to a customizable digital recording and play back device to allow for gifting of audio content such as music and vocal greetings. This invention also includes the system and method of gifting audio content such as music in combination with a traditional gift.

BACKGROUND

Sending gifts to others through delivery by a vendor is generally known. For example, it is quite common for a sender to contact a florist, such as, by telephone in person or through a website, and select a floral arrangement to be delivered to the receiver by the florist. It is also common for gifts to be sent to recipients that include items such as gift cards such as an iTunes card. Whole singing telegrams are passé, the singing telegram was an attempt to provide audio messages with gifts.

There have also been efforts to send gifts accompanied by audio message to gift recipients such as described in United States Patent Application Publication 2012/0059703 (McCoy). Unfortunately, the system for ordering personalized items with gift delivery, as described in McCoy, requires a central floral ordering system, central media server, and electronic communications with each florist. Given that the U.S. Census Bureau's County Business Patterns Report shows that there were 16,182 florists in 2010, a centralized floral ordering system requirement is simply unrealistic. There have also been attempts to create gift clusters as shown in United States Patent Publication Application 2006/0178946 (Agarwal). Again, Agarwal is also limited in that it relies exclusively on a central server.

U.S. Pat. No. 7,356,154 discloses an audio player activated by a greeting card so that when the greeting card is removed, the invention plays a verbal of a musical greeting when the card is removed. However, this invention relies upon a card being in place to prevent activation. Further, there is no ability to revoke or to obtain content as disclosed in the present invention.

Therefore, it is an object of the current invention to provide for a device that allows for gifting audio content without the need for gift vendors to subscribe or otherwise be connected to a central server while also allowing for personalized greetings and other audio content to be delivered with gifts.

SUMMARY OF THE INVENTION

The above objectives are accomplished by providing a gifting computing system comprising of: a water resistant housing containing a computer readable medium having computer readable instructions, a processor, a power supply, a speaker, a proximity sensor, an accelerometer and at least one operational button; an attachment member included in the housing for attaching the housing to a base or standard that can be carried by a gift to be presented to a recipient; an external card slot disposed externally to a cavity defined in the housing for securing a message card to the housing wherein the cavity contains the electrical components; a communications port carried by the housing providing electronic communications between the computer readable medium and a content server having audio content; the set of computer readable instructions includes instructions that, when executed by the processor, provide for: receiving the audio content from the server, storing the audio content on the computer readable medium, playing the content if the proximate sensor determines an object is within a predetermined distance, playing the content if the accelerometer determines that the housing is in motion, or playing the content when an operational button is depressed; and, wherein a set of server computer readable instructions include instructions for determining if the audio content is copyright restricted according to the audio content header information and deleting the audio content from the server if the content is copyright restricted. In one embodiment, the source of the audio content is used to determine the existence of restrictions or procedures.

The invention can include a clip attached to the back side of the housing allowing the housing to be removably attached to another object. The clip can be removably attached to the housing. The predetermined distance associated with the proximity sensor can be between 0 and 24 inches. The predetermined distance associated with the proximity sensor can be less than or equal to 12 inches. The playing of the audio content can be delayed a predetermined period of time. Lights can be in communications with the computer readable instructions and can be actuated when the audio content is played.

The server can include a set of server computer readable instructions that, when actuated by a server processor, provide for: receiving a request for gifting audio content from a user using a user's computer system in communications with the server, determining if the audio content is available on the server, transmitting the audio content to the remote computer readable medium, if the audio content is available locally and if not: locating the audio content on a third party server in communications with the server if the audio content it not located on the server, determining if the audio content received from the third party server is restricted and deleting the audio content from the server if the content is restricted and transmitting the audio content received from the third party server to the remote computer readable medium.

A greeting can be stored on the remote computer readable medium that can be played prior to the playing of the audio content. The greeting can be selected from pre-recorded greetings. A speaker section can be included in the housing having a plurality of openings so that when the housing is carried by a gift, a ledge included in the speaker section assists in supporting the housing with the gift. A tapered section can be defined in the housing to assist with inserting the housing into a gift.

The housing can contain a circuit board having a processor and computer readable medium; a set of operational buttons attached to the circuit board; a communication port attached to the circuit board; a speaker section included in the housing that extends outward from the housing and defines a ledge to support the housing on a gift; a plurality of openings defined in the speaker section; a speaker disposed adjacent to the speaker section, internal to the housing and attached to the circuit board; an attachment member included in the housing for attaching the housing to a base or standard to assist with attaching the housing to a gift; and, a set of computer readable instructions stored on the computer readable medium that, when executed by the processor, provide for: receiving audio content from a server in electronic communications with the circuit board using the communications port, playing the audio content when an operational button is placed in the on position. The system of claim 13 wherein the computer readable instructions can receive sensitivity information from the operational button and set the distance for the proximity sensor to actuate playing of the audio content and the degree of motion needed for the accelerometer to actuate the playing of the audio content.

DESCRIPTION OF THE DRAWINGS

The following description of the invention will be better understood by reference to the following drawings that are incorporated and made part of the written specification:

FIGS. 3A and 3B are schematics of aspects to the invention;

DESCRIPTION OF THE INVENTION

The present invention is now described more fully herein with reference to the drawings in which the preferred embodiment of the invention is shown. This invention may, however, be embodied in many different forms and should not be construed as limited to the embodiment set forth herein. Rather, these embodiments are provided so that this disclosure will be thorough and complete and will fully convey the scope of the invention to those skilled in the art.

Figure 1:
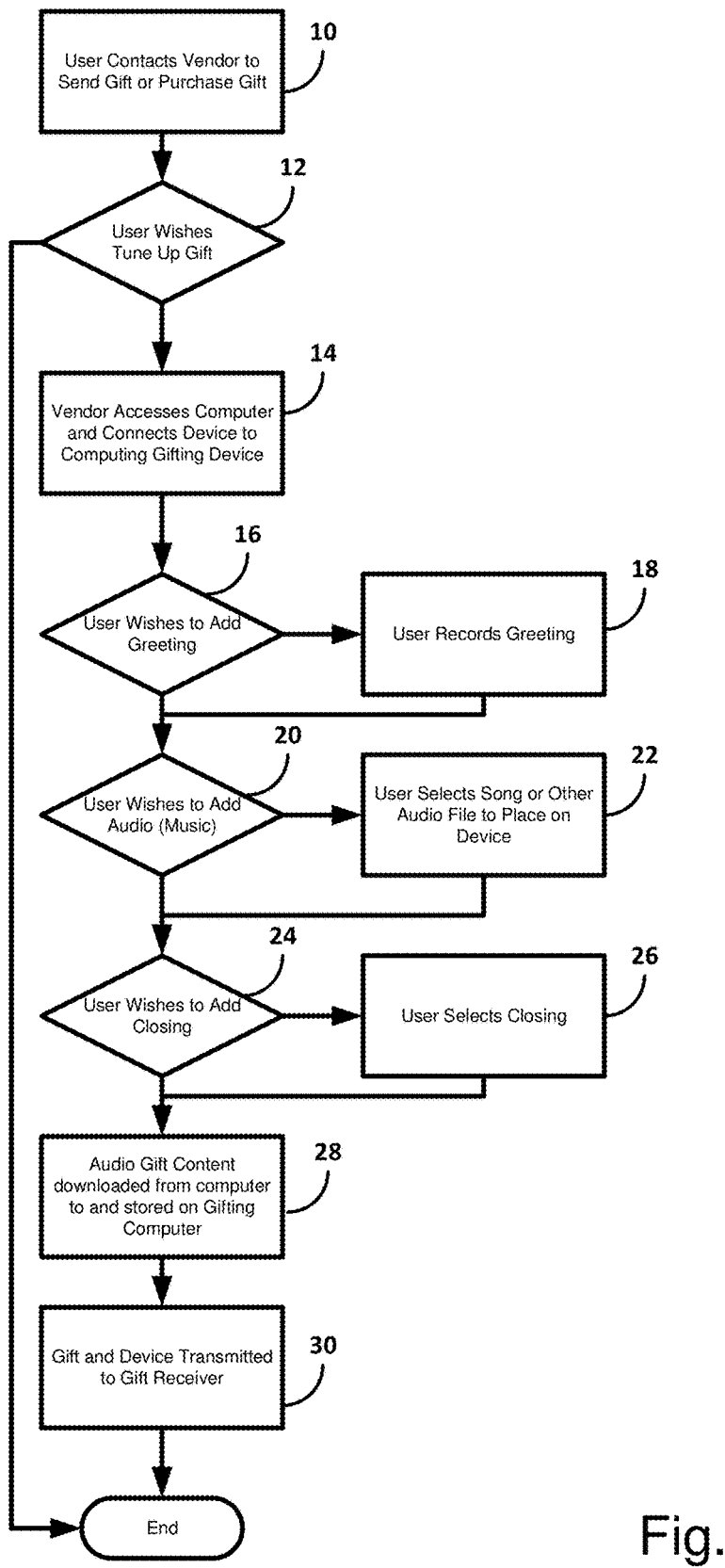
FIG. 1 is a flowchart of aspects of the invention.

The present invention is designed to provide a system and method for gifting audio such as music for greetings. Referring to FIG. 1, the user at 10 contacts a vendor of a traditional gift such as flowers, candy or other item and is asked from the vendor if the user wants to "tune up" for gift at 12. If the user answers affirmatively, the vendor accesses the vendor's computer and attaches a gifting computing device at 14. The user is then asked if the user wishes to add an introductory greeting at 16. If so, the user can record the greeting at the physical location of the vendor or record through the phone or through a webpage or send the greeting to the vendor through means such as email or other electronic communications at 18. The user is then asked to select audio information (such as music) at 20. The vendor then can retrieve the audio information either as it is sent to the vendor from the user or retrieve the audio information from a third party source such as web services providing audio content at 22. The user is then asked if the user wants to add a closing at 24 and if so, the closing is provided to the vendor in the same or similar manner as the greeting at 26.

In one embodiment, the server is in communications with a third party server and if the audio content is not located on the server, the server computer readable instructions locates the audio content on a third party server in communications with the server if the audio content it not present locally, determines if the audio content received from the third party server is restricted and deletes the audio content from the server if the content is restricted. The audio content is then transmitted from the server to the remote computer readable medium.

Once the audio gift components are determined and provided to the vendor, the audio gift components are stored on the vendor's computer only as necessary to download the audio gift to the gifting computing device at 28. The gifting computing device is then delivered to the recipient with the gift for which it is associated at 30.

In one embodiment, the traditional gift that the gifting computing device is associated with is flowers. One of the issues with flowers is that for flowers presented in a vase, there is water in the vase for the well-being of the flowers. It is known that water is harmful to computing devices and can irreparably damage such a device so that without further protection, the computer device is subject to destruction in the intended environment.

Figures 2A, 2B:
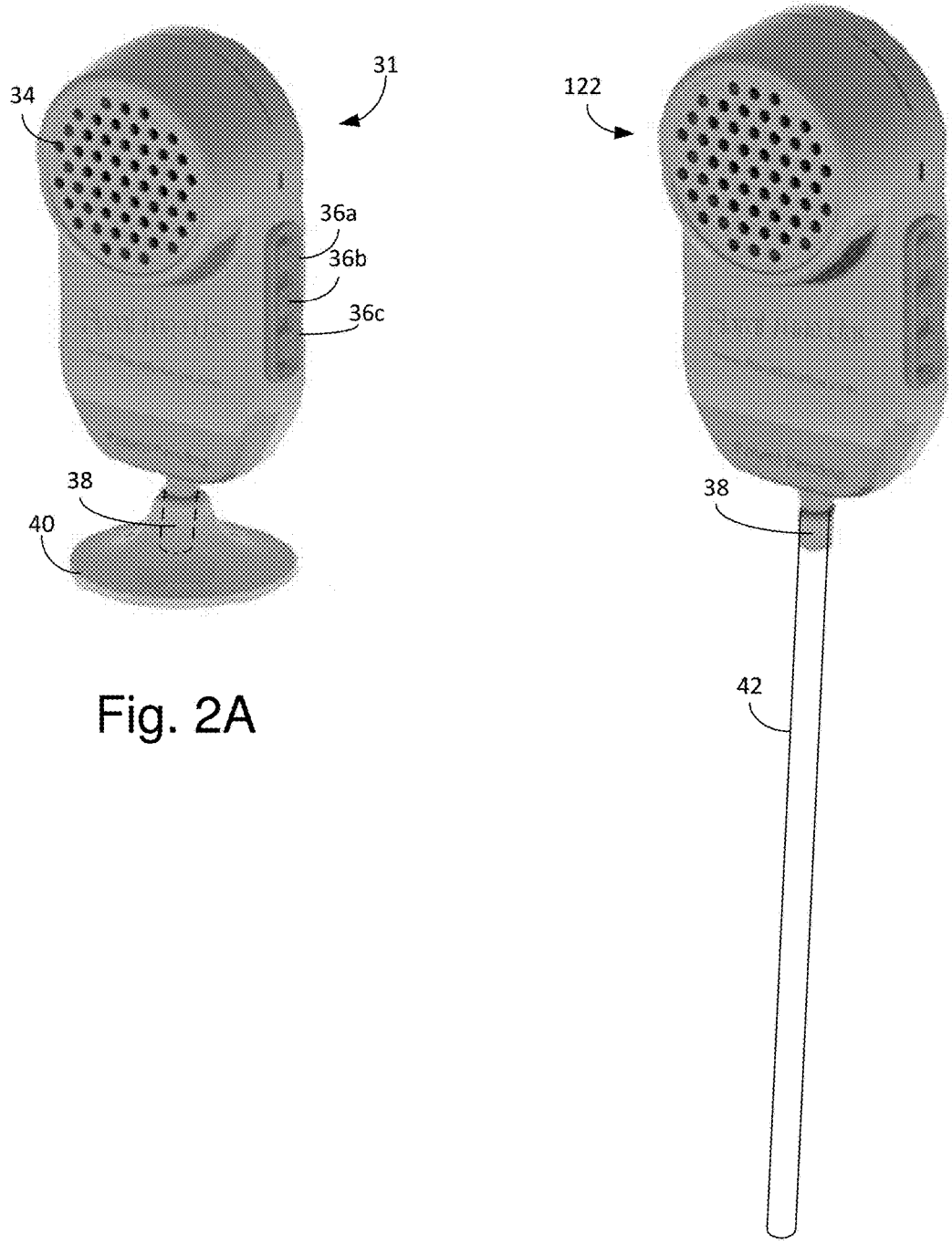
FIGS. 2A and 2B are schematics of aspects to the invention.

Referring to FIG. 2A, the gifting device is shown in further detail. In one embodiment, the gifting device includes a case or housing 31 that has an opening or openings 34 to allow audio to be projected from the inside the case to a listener/recipient. Operational buttons 36a through 36c can be included that provide operational functionality. For example, in one embodiment, one button is an on/off button for the playing of the device. One button can be a play/stop button; one button can be volume up and one button volume down. In one embodiment, the on/off button can also duplicate as a play and a stop button distinguishable with whether the press of the button is a long press, single press, multiple press and the like. In one embodiment, the operational buttons can be used to activate and deactivate the proximate sensor and accelerometer. In one embodiment, the operational buttons can be used to activate or deactivate the delay in playing the audio content.

The gifting device can include a computer readable medium that includes computer readable instructions that when processed by the CPU, remembers, stores, and replays the audio information at the last volume selected. In one embodiment, a motion detector can be included so that the gifting computing device will play the audio content when the motion detector is actuated. In one embodiment, the gifting computing device can include an accelerometer which can play the audio content when the gifting computing device is moved, stops moving upon a predetermined time from motion, or stops motion or any combination of these.

In one embodiment, the content can be played if a proximity sensor included in the housing determines that an object is within a predetermined distance. In one embodiment, the predetermined distance is less than 12 inches. In one embodiment, the predetermined distance is between 0 and 24 inches.

The gifting computing device, in one embodiment, can repeat the audio content periodically in predetermined or customized intervals. In one embodiment, the playing of the content can be delayed (playback delay) upon pressing the on or play button allowing the gifter to present the gift to the recipient without the audio playing immediately giving the gifter time to present the gift. When the audio content is actuated for playing such as by the proximity sensor, operational buttons, accelerometer of the like, the audio content can be delayed between 0 and 1 minute allowing the recipient to receive the gift prior to the audio content being presented. In one embodiment, the audio content is delayed between 0 and 30 seconds.

The case can include an attachment member 38 that can be removably attached to a base 40 or otherwise affixed to the attachment member. The base can be used to support the case when the case is placed on or in a gift such as candies, book, or other such items. The base can be affixed to the gift or the wrapping of the gift and delivered to the recipient with the device.

Referring to FIG. 2B, the attachment member can also be affixed to a stem 42. The stem can then be placed in a vase with flowers or other items. The stem supports the case above any water or other liquid in the vase therefore preventing the case and its contents from being damaged. The stem can be placed in the vase, pressed into foam that can be included in the base of the arrangement or included in the bundle of flowers. As flower arrangements have traditionally been assembled with stems, the addition of this invention does not require any additional skills concerning the assembly of the floral arrangement. In one embodiment, the case is water resistant so that when water is added to the vase and accidentally, or unintentionally, contacts the case, the interior of the case is not damaged.

The housing can include a plurality of openings 122 to allow sound to exit the housing wherein the sound is generated by an internal speaker. Because the audio content can be a high quality recording, the speaker used can be approximately 1 inch in diameter and be an ultra-thin full range Mylar speaker. The speaker used can include a frequency response between 300 Hz and 25 kHz with a resonant frequent of about 700 Hz. The outer diameter can be included in the range of 25 mm to 29 mm. A seal can be included in the case between the outer diameter of the speaker and an inner wall of the housing to increase the water resistance and account for the opening in the housing.

Referring to FIGS. 3A and 3B, the attachment member can include ridges 44 that can assist with a friction fit of the base or stem by engaging the interior of a receiving member of the base or stem that receives the attachment member providing a more secure fit to the case. In some applications, the case can be clipped to the gift using clip 46. Further, accessories can be inserted into the clip that represent events such as Merry Christmas, Get Well Soon, I Love You, Happy Mother's Day and the like. The accessory can include a flexible material that allows for customized message or a pre-printed rigid card. The clip can be removably attached to the case or affixed to the case. The clip can be biased against the case and, in one embodiment, can include a spring to bias the clip against the case. In one embodiment, the case can include a card slot 47 for receiving and holding a message card. In this embodiment, the case also serves as the card holder so that the need for the traditional "trident" card holder is eliminated. The card slot can be an external card slot defined in the housing so that the card does not extend into a cavity defined in the housing containing the electrical components of the present invention.

Referring to FIG. 3B, the case or housing can include a speaker section 110 that extends outward defining a ledge 112. The ledge can be used to rest on the upper lip of a vase, box, and the like, to further support the housing in the gift. The housing can include a tapered section 114 to assist with inserting the housing into a gift such as a floral arrangement. The tapered section causes the housing to display items such as flower stems and the like rather than to force the stem lower into the vase. The tapered section can be defined as having a front slanted area 116, rear slanted area 118 and lateral slanted areas 120a (FIG. 3A) and 120b (not shown). The lower edges can be rounded to further facilitate the insertion of the housing into a gift such as a flower arrangement.

Figure 4:
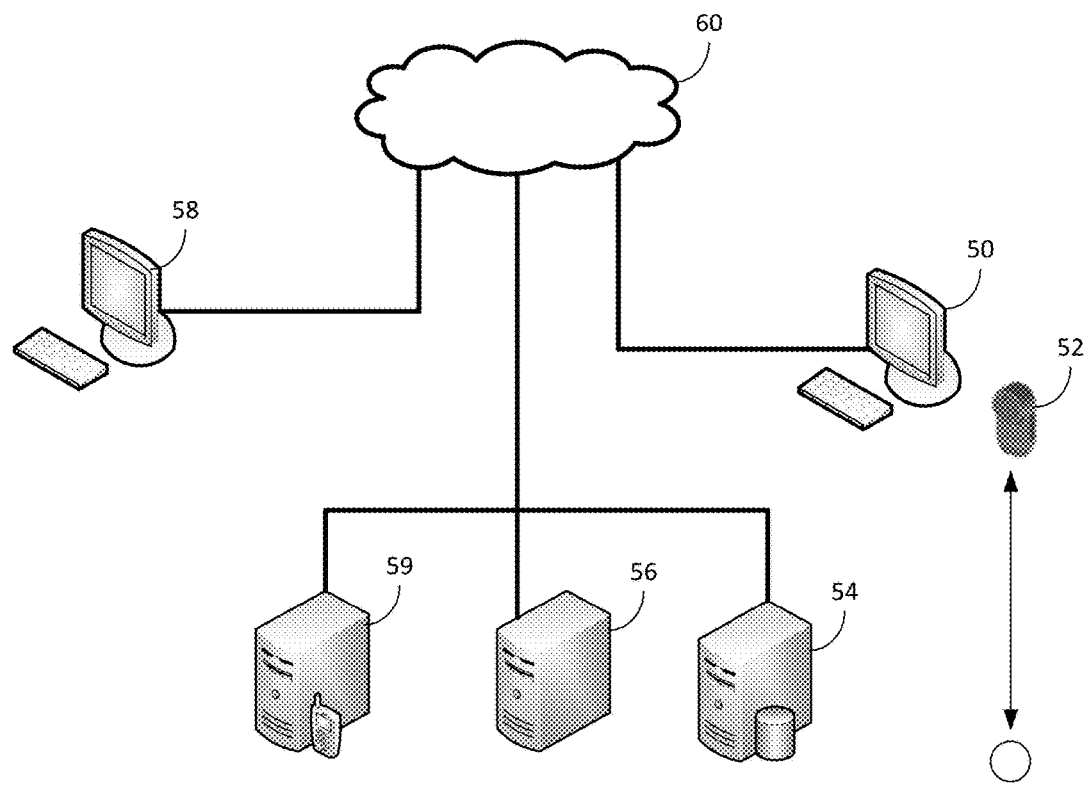
FIG. 4 is a schematic of aspects to the invention.

Referring to FIG. 4, the infrastructure that accompanies the invention is shown in more detail. The vendor computer 50 includes a software application having computer readable instructions embodied on a computer readable medium that when executed by a processor provides functionality associated with the invention. The vendor computer can be in electronic communications with the gifting computing device 52 through wired or wireless means. The gifting computing device can include a communications port for providing electronic communications with a server. The port can be a Bluetooth connection, Wi-Fi, USB port, serial or analog port, or the like to transmit and receive digital information to and from the vendor's computer. The vendor's computer can also be in electronic communications with a content server 54 that contains audio content that can be retrieved by the vendor and placed on the gifting computing device. The vendor's computer can also be in electronic communications with an administrative server 56 that facilitates the ability of users and vendors to conduct transactions between senders, recipients, content providers, credit card clearing houses, payment services, delivery services and the like. The vendor computer can also be in electronic communications with the sender's computer 58. The various computers can be connected through a local area network, wide area network or global network 60.

In one embodiment, the sender of the gift can access a computer system 59 such as with a Software as a Service (SaaS) model and create a greeting, song, recipient information and the like. The greeting can be recorded by the sender or can be selected from a pre-recorded set of greetings. For example, the greeting can include "Happy Birthday, Happy Anniversary" and the like. This information can be accessed by a vendor such as a florist and retrieved onto the florists system. The gift content can be transferred to the gifting computing device and the gift can be picked up by the sender, delivered to the recipient or otherwise transmitted to the recipient. Therefore, it is possible to track the history of the sender's activity as well as for the sender to store recipient information for subsequent use. The data of the sender and all senders can be aggregated to analysis. This allows the sender to avoid duplications within too short a period of time to the same recipient. Alternatively, the sender can simply contact a gift vendor and have the gift include the invention without the need to create or maintain an account.

Figure 5:
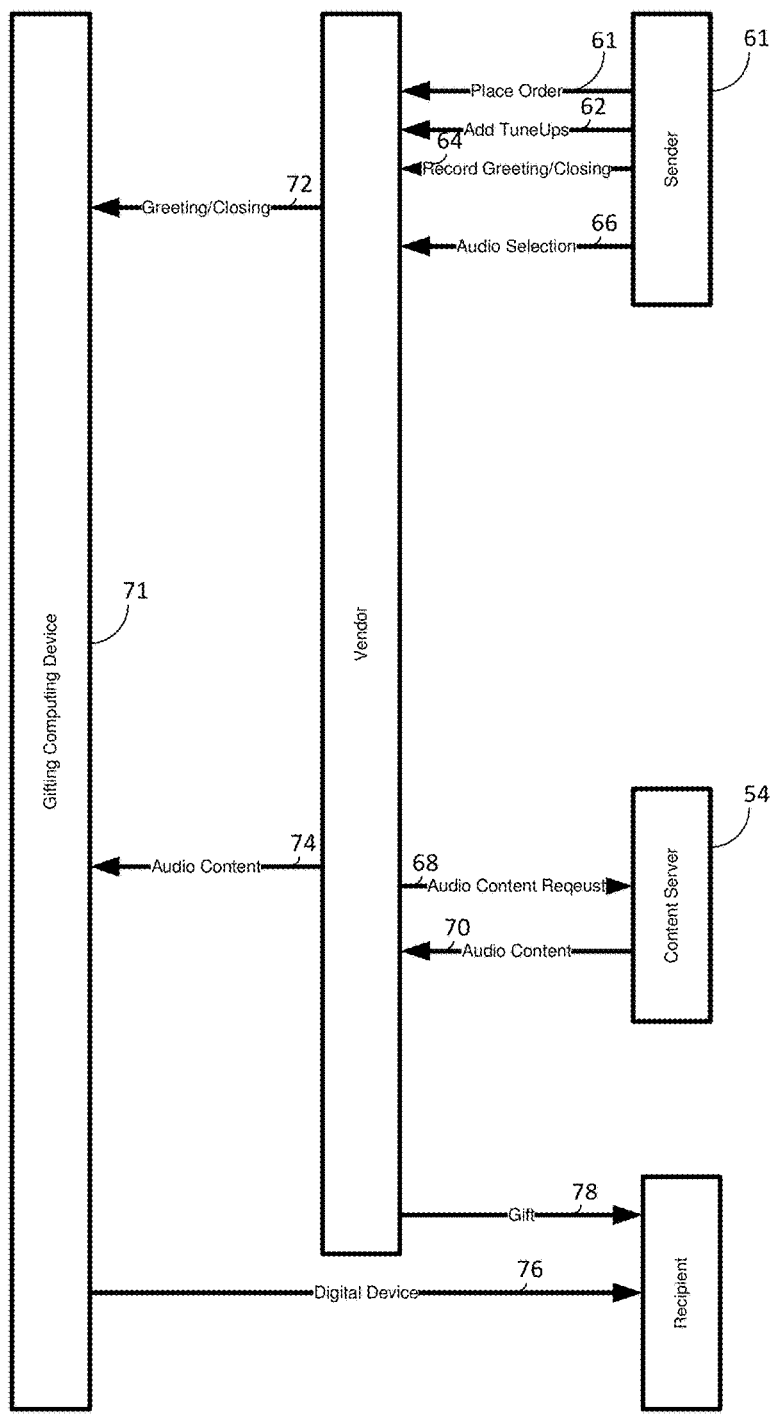
FIG. 5 is a diagram of information and data flow of the invention.

Referring to FIG. 5, the data and information flow of the present invention is shown. The sender 61 places an order with the vendor shown as 60. The order can be placed either by calling the vendor, physically with the vendor, or online. The sender also informed the vendor if the sender wishes to include an audio gift and the sender provides response 62. The sender can record a greeting or closing 64 either physically at the vendor's location, over the phone, or by transmitting an audio file, such as by emailing an audio file to the vendor. The sender can then make an audio selection at 66 and inform the vendor which audio content the sender wants to provide or can provide the sender with audio content. The vendor can then retrieve audio content that was requested by the sender by making a retrieval request 68 to a third party content source 54 and receiving the content 70. The greeting and closing content 72 and audio content 74 can be transmitted and placed upon the gifting computing device. The digital device 71 is then transmitted at 76 to the recipient along with the gift at 78.

Figure 6:
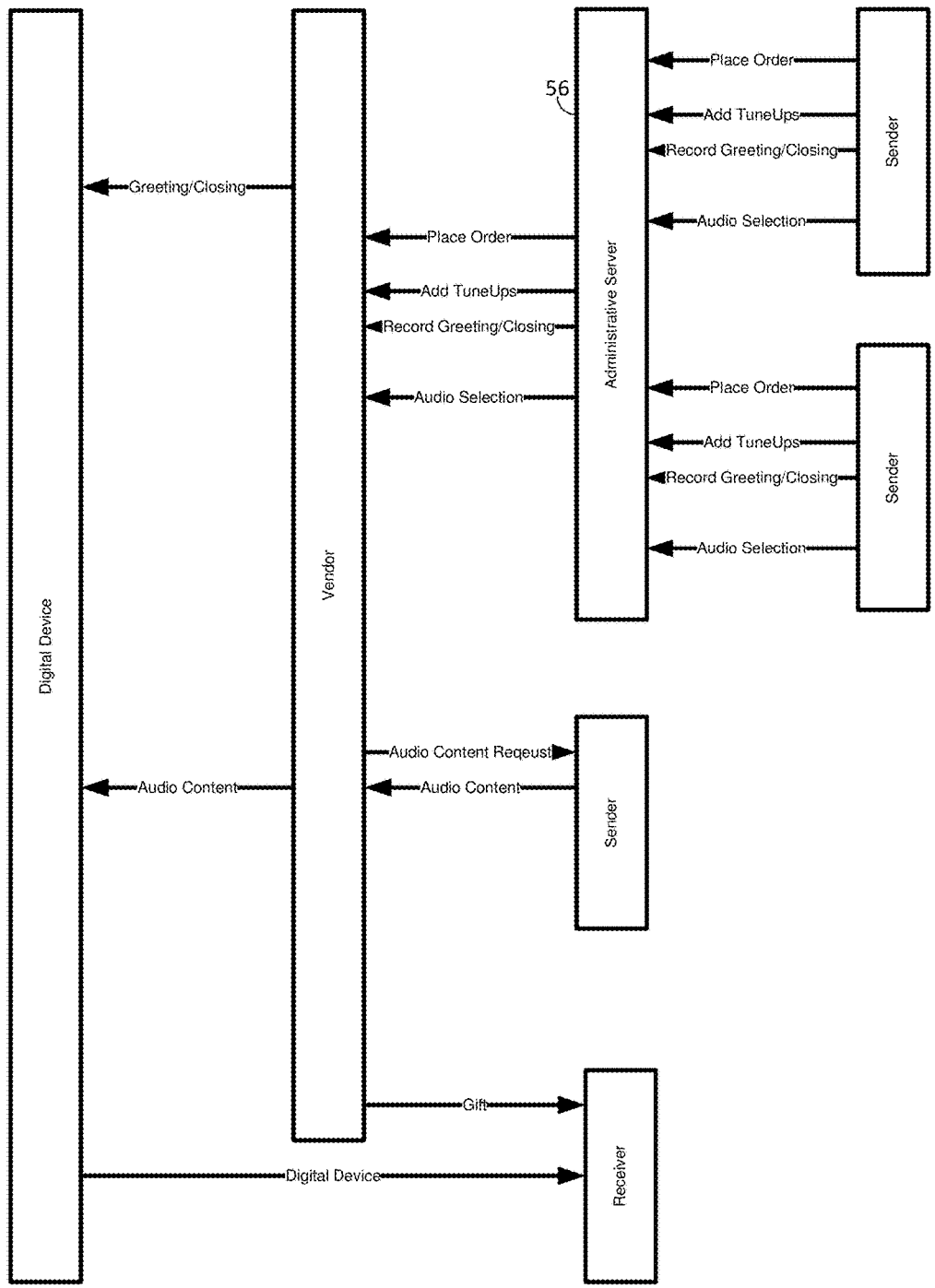
FIG. 6 is a diagram of information and data flow of the invention.

Referring to FIG. 6, another embodiment is shown where multiple senders can access the administrative server 56. In this embodiment, the vendor accesses the administrative server and can determine what orders have been placed by senders. The orders from the senders can be packaged for the vendor so that the greeting, audio content, closing, gift selection, recipient and payment information are associated in one order. Using this information, the vendor can determine if the vendor needs to contact the sender to record the greeting or closing, retrieve audio content requested by the sender and the like.

Figure 7:
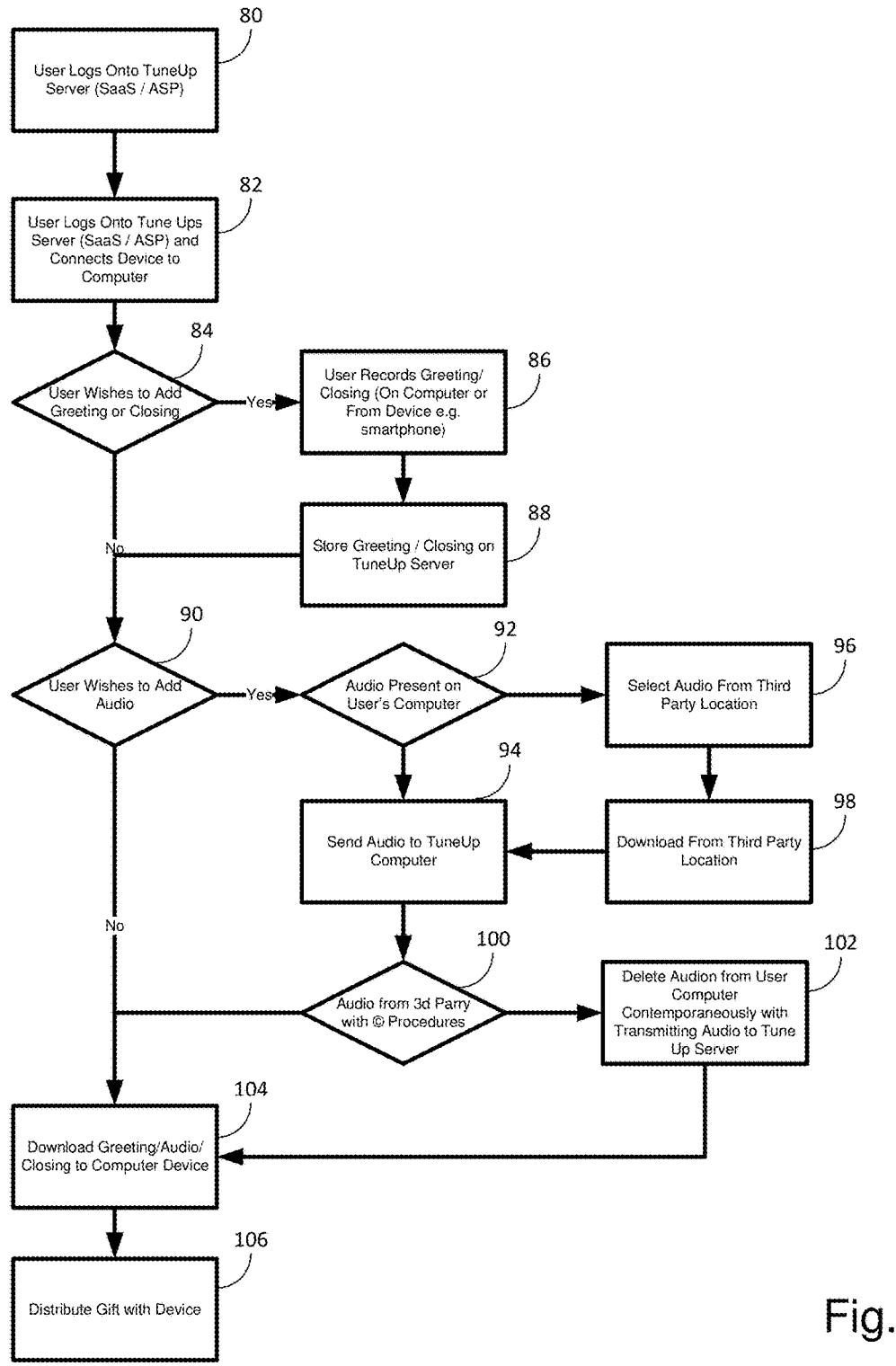
FIG. 7 is a flowchart of aspects of the invention.

Referring to FIG. 7, one embodiment with on line ordering is shown. The sender accesses computer readable instructions that can be located on the administrative server at 80. This can be a SaaS model, ASP model or the like. The vendor (or the sender in one embodiment) either connects the gifting computing device to a terminal connected to the administrative server or other computing devices or otherwise generates an electronic communications connection with the gifting computing device at 82. The user then decides to add a greeting or closing at 84. If so, the sender records the greeting and can transmit it to the administrative server or vendor at 86. In one case, the vendor can also record the greeting or closing over the phone from the sender. The greeting or closing is recorded on the administrative server at 88.

The inquiry is made if the sender or vendor wishes to include audio content with the gift at 90. If so, an inquiry is made whether the audio content is present on the sender's or vendor's computer at 92. If so, the audio content is transmitted to the administrative computer or the vendor's computer at 94. If the content is not on the sender's or vendor's computer, the audio content can be selected from a third party location at 96 and downloaded to the administrative computer or vendor's computer at 98. If the audio content that is downloaded only allows for a single copy or has other copyright restriction or procedures, is determined at 100, when the copy is downloaded from the third party to the administrate server or vendor computer that copy of contemporaneously deleted at 102 when the audio content is placed on the gifting computing device. The audio content can include header information that indicates whether the audio content is subject to copyright restrictions or procedures. For example, iTunes can allow up to six copies to be distributed to family members. In one embodiment, the header information includes information concerning copyright restrictions. For example, a MPEG audio file includes header information having 32 bits. Bit 28 can include a dual position single bit indicator that is set to 0 if the audio content is not copyright restricted and 1 of the audio content is copyright restricted.

For example, one vendor allows the sharing of eligible products with up to six family members. In this case, the audio content header information could include the number of active copies that have been made. In the event that the sender wishes to provide the audio content to a family member, the computer readable instructions can download the content from the vendor and update the header information to represent that an additional copy has been made to a family member. In the event that the family member has exceed the maximum number of copies that are sharable, the computer readable instructions can delete the audio content from the sender's account once the copy is placed on the gifting device to stay within the limitations of the copyright restrictions or procedures. The content (greeting, audio and closing) is transmitted to the gifting computing device at 104 and delivered or provided to the recipient at 106 with the gift.

Figure 8:
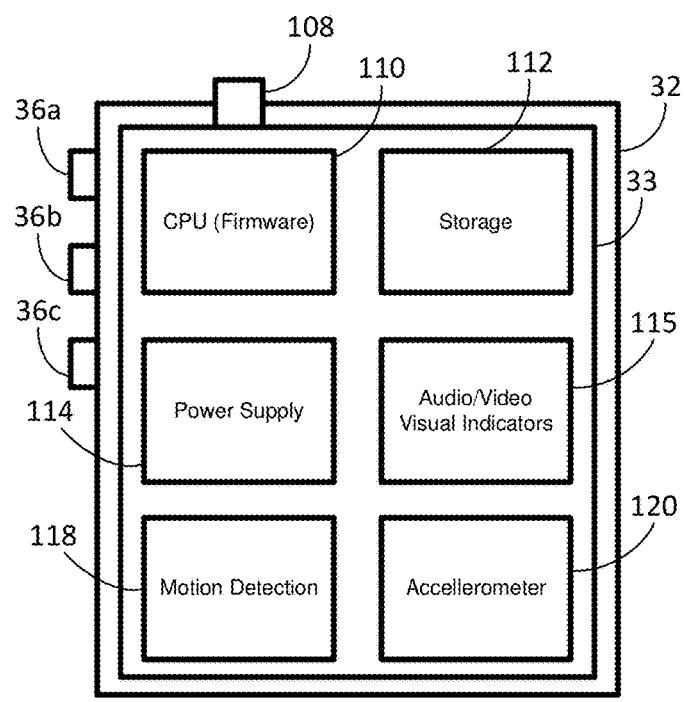
FIG. 8 is a schematic of aspects of the invention.

Referring to FIG. 8, the gifting device is shown in further detail. Case 32 houses a circuit board 33 that is connected to buttons 36a through 36c. A communications port 108 is also attached to the circuit board for USB connections and the like. A CPU 110 is included for executing computer readable instructions (e.g. firmware) that is included in the invention. There is storage 112 that is included in the invention for storing computer readable instructions, greeting content, audio content and closing content. A power supply 114 provides power and can be rechargeable on some embodiments. Audio/Visual module can include lights and speaker to provide audio and/or visual information to the recipient. In one embodiment, different colored lights 115 are actuated based upon the frequency or dynamics within the audio content.

A motion detector/accelerometer 118 can be included so that when the motion detector detects motion, the greeting, audio content or closing plays. In one embodiment, the greeting, audio, or closing content is looped so that is can start at the same place in the loop where it stopped. When the motion detector detecting motion results in playing of the greeting, audio or closing content, the content can play for a predetermined period of time and then cease. In one embodiment, one of the buttons can be used to turn on and off the motion detection feature.

An accelerometer 120 can be included in the invention and when it detects that the case has been moved, the greeting, audio content or closing plays. When the accelerometer results in paying of the greeting, audio or closing content, and the content can play for a predetermined period of time and then cease. The sensitivity of the accelerometer can be adjusted so that the motion required to trigger the content playing can be varied. The computer readable instructions can receive sensitivity information from the operational button and set the distance for the proximity sensor to actuate playing of the audio content and the degree of motion needed for the accelerometer to actuate the playing of the audio content. For example, the operational button can be set so that one press is 0 inches for the proximity sensor and each subsequent press increase the distance by one inch increments. In one embodiment, one of the buttons can be used to turn on and off the accelerometer feature.

It is understood that the above descriptions and illustrations are intended to be illustrative and not restrictive. Other embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventor did not consider such subject matter to be part of the disclosed inventive subject matter.

What is claimed is:

1. A gifting computing system comprising:
   a water resistant housing containing a circuit board having a processor and computer readable medium;
   a set of operational buttons attached to the circuit board;
   a communication port attached to the circuit board;
   a speaker section included in the housing that extends outward from the housing and defines a ledge to support the housing on a gift;
   a plurality of openings defined in the speaker section;
   a speaker disposed adjacent to the speaker section, internal to the housing and attached to the circuit board;
   an attachment member included in the housing for attaching the housing to a base or standard to assist with attaching the housing to a gift; and, a set of computer readable instructions stored on the computer readable medium that, when executed by the processor, provide for: receiving an introductory greeting, storing the introductory greeting on the circuit board, receiving deleteable audio content from a remote server in electronic communications with the circuit board using the communications port, storing the deleteable audio content on the circuit board, receiving a closing, storing the closing on the circuit board, and playing the introductory greeting, deleteable audio content, and closing when an operational button is placed in the on position.

2. The system of claim 1 including a proximity sensor that, when activated by one of the operational buttons, plays the audio content when an object is a predetermined distance to the housing.

3. The system of claim 1 including an accelerometer that, when activated by one of the operational buttons, plays the audio content when the housing is moved.

4. The system of claim 1 wherein the computer readable instructions determine an operational button associated with playback delay is activated and to delay playing the audio content upon a determination of one of the following: a proximity sensor attached to the circuit board detecting motion, an accelerometer attached to the circuit board detecting motion, actuating an on operational button, actuating a play operational button and any combination thereof.

5. The system of claim 1 including lights attached to the circuit board that are actuated when the audio content is played.

6. The system of claim 1 including an external card slot disposed externally to a cavity defined in the housing that contains the circuit board and for securing a message card to the housing.

7. The system of claim 1 including a clip removeably attached to a back side of the housing allowing the housing to be removeably attached to a gift.

8. The system of claim 1 wherein the computer readable instructions can receive sensitivity information from the operational button and set the distance for the proximity sensor to actuate playing of the audio content and the degree of motion needed for the accelerometer to actuate the playing of the audio content.

* * * * *